United States Patent
Brubeck

(10) Patent No.: US 9,292,897 B2
(45) Date of Patent: Mar. 22, 2016

(54) WATERMARKING OF IMAGES

(71) Applicant: MobiTV, Inc., Emeryville, CA (US)

(72) Inventor: David Brubeck, Pleasanton, CA (US)

(73) Assignee: MobiTV, Inc., Emeryville, CA (US)

(*) Notice: Subject to any disclaimer, the term of this patent is extended or adjusted under 35 U.S.C. 154(b) by 438 days.

(21) Appl. No.: 13/646,520

(22) Filed: Oct. 5, 2012

(65) Prior Publication Data

US 2014/0098985 A1 Apr. 10, 2014

(51) Int. Cl.
| | |
|---|---|
| H04N 21/8358 | (2011.01) |
| G06T 1/00 | (2006.01) |
| H04N 21/2389 | (2011.01) |
| H04N 21/845 | (2011.01) |
| H04N 21/854 | (2011.01) |

(52) U.S. Cl.
CPC ........ *G06T 1/0028* (2013.01); *H04N 21/23892* (2013.01); *H04N 21/8358* (2013.01); *H04N 21/8456* (2013.01); *H04N 21/85406* (2013.01); *G06T 2201/0061* (2013.01)

(58) Field of Classification Search
None
See application file for complete search history.

(56) References Cited

U.S. PATENT DOCUMENTS

| | | | |
|---|---|---|---|
| 8,818,021 B2 | 8/2014 | Brubeck et al. | |
| 2005/0246341 A1* | 11/2005 | Vuattoux et al. | 707/9 |
| 2007/0140524 A1 | 6/2007 | Kumar et al. | |
| 2013/0227293 A1 | 8/2013 | Leddy et al. | |
| 2014/0086445 A1 | 3/2014 | Brubeck et al. | |

OTHER PUBLICATIONS

Johnson, Neil F., Zoran Duric, and Sushil Jajodia. "A role for digital watermarking in electronic commerce." ACM Computing Surveys 328 (1999).*
Fridrich, Jessica. "Combining low-frequency and spread-spectrum watermarking." SPIE's International Symposium on Optical Science, Engineering, and Instrumentation. International Society for Optics and Photonics, 1998.*
U.S. Appl. No. 13/625,262, filed Sep. 24, 2012, Brubeck, et al.
Schulzrinne, H. et al., "RTP: A Transport Protocol for Real-Time Applications", *The Internet Society*, (2003),1-89.
"[MS-RTSP]: Real-Time Streaming Protocol (RTSP) Windows Media Extensions", *Microsoft Corporation*, (Jul. 5, 2012),1-142.
Pantos, R et al., "HTTP Live Streaming: draft-pantos-http-live-streaming-08", [Online]. Retrieved from the Internet: < http://tools.ietf.org/pdf/draft-pantos-http-live-streaming-08.pdf >, Accessed on Jul. 17, 2012,(Mar. 2012),1-34.

(Continued)

*Primary Examiner* — Stephen R Koziol
*Assistant Examiner* — Raphael Schwartz
(74) *Attorney, Agent, or Firm* — Kwan & Olynick LLP

(57) ABSTRACT

Techniques and mechanisms described herein facilitate the watermarking of images. According to various embodiments, a watermark image to apply to a digital image is identified. The digital image may include a plurality of image pixel data values. Each of the image pixel data values may designate a color of a corresponding pixel in the digital image. The watermark image may include a plurality of watermark pixel data values. Each of the watermark pixel data values may designate a color change to a corresponding pixel. The watermark image may be of relatively low frequency and may exhibit relatively gradual transitions and relatively constant color tone. The watermark image may be superimposed on at least a portion of the digital image to create a watermarked digital image.

9 Claims, 10 Drawing Sheets

(56) References Cited

OTHER PUBLICATIONS

Schulzrinne, H et al., "Real Time Streaming Protocol (RTSP)", *The Internet Society*, [Online]. Retrieved from the Internet: < http://tools.ietf.org/pdf/draft-ietf-mmusic-rfc2326bis-29.pdf >, Accessed on Jul. 17, 2012,(Feb. 1998),74 pgs.

Siglin, Timothy et al., "Unifying Global Video Strategies: MP4 File Fragmentation for Broadcast, Mobile and Web Delivery", *White Paper, Transitions in Technology*, [Online]. Retrieved from the internet: <http://184.168.176.117/reports-public/Adobe/20111116-fMP4-Adobe-Microsoft.pdf >,(Nov. 16, 2011),16 pgs.

"MPEG-4—The Media Standard", [Online]. Retrieved from the Internet: <http://www.m4if.org/public/documents/vault/m4-out-20027.pdf >,(Nov. 19, 2002),30 pgs.

Sullivan, Gary J., et al., "The H.264/AVC Advanced Video Coding Standard: Overview and Introduction to the Fidelity Range Extensions", *SPIE Conference on Applications of Digital Image Processing XXVII, Special Session on Advances in the New Emerging Standard*, [Online]. Retrieved from the Internet: <http://www.fastvdo.com/spie04/spie04-h264OverviewPaper.pdf >,(Aug. 2004),22 pgs.

"ATSC Digital Television Standard: Part4—MPEG-2 Video System Characteristics", *Advanced Television Systems Committee, Inc.*, [Online]. Retrieved from the Internet: < http://www.atsc.org/cros/standards/a53/a_53-Part-4-2009.pdf >,(Aug. 7, 2009),18 pgs.

Wallace, Gregory K., et al., "The JPEG Still Picture Compression Standard", [Online]. Retrieved from the Internet: <http://white.stanford.edu/~brian/psy221/reader/Wallace.JPEG.pdf >,(Dec. 1991),17 pgs.

"U.S. Appl. No. 13/625,262, Non Final Office Action mailed Feb. 13, 2014".

Zou, Dekun et al., "Compressed Video Stream Watermarking for Peer-To-Peer Based Content Distribution Network", Multimedia and Expo, 2009. ICME 2009. IEEE International Conference on. IEEE, 2009, 1390-1393.

"U.S. Appl. No. 13/625,262, Notice of Allowance mailed Jun. 12, 2014".

\* cited by examiner

WATERMARKING OF IMAGES

TECHNICAL FIELD

The present disclosure relates to the application of digital watermarks to digital images.

DESCRIPTION OF RELATED ART

Digital content such as audio, video, and image content may be modified to contain hidden information via digital watermarking techniques. Embedding hidden information in digital content may be used for various purposes. For instance, the information contained in a digital watermark may be used to identify the source of the digital content. If a digital watermark is specific to a content source, then a copy of the digital content may be analyzed subsequent to distribution to identify this source. Such techniques may be used, for example, to facilitate the investigation of copyright infringement. If unauthorized distribution of content occurs and is noticed by the copyright holder, the watermark can be read and the source of the distribution can be identified. Content providers can then take corrective action with the offender to stop the distribution and/or recover financial losses.

BRIEF DESCRIPTION OF THE DRAWINGS

The disclosure may best be understood by reference to the following description taken in conjunction with the accompanying drawings, which illustrate particular embodiments.

FIGS. 4, 5, 6A, and 6B illustrate examples of low frequency watermark images.

DESCRIPTION OF EXAMPLE EMBODIMENTS

Figure 1:
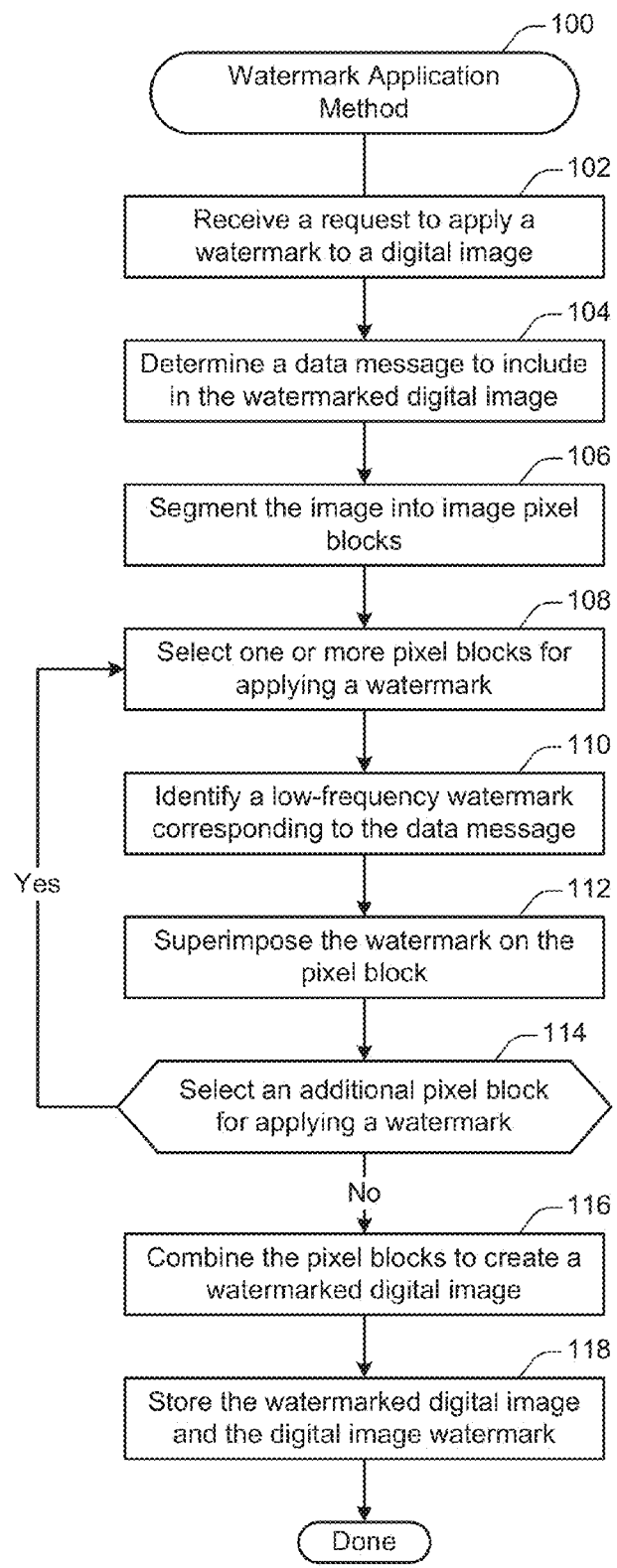
FIG. 1 shows a method 100 for the application of watermarks.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the application of digital watermarks to media content such as images or video image frames. A watermark may encode one or more bits of information. This information may be used later to identify a source or recipient of a watermarked image. Digital watermarks are more effective if they are difficult to detect and remove. A recipient of a watermarked digital image may attempt to remove the watermark by cropping, compressing, re-encoding, or otherwise altering the image. Many alteration techniques involve altering the high-frequency properties of an image. Accordingly, a low frequency digital watermark applied to the image may survive many or most subsequent alterations of the image.

Example Embodiments

According to various embodiments, a digital watermark may refer to any information hidden in digital content by a change that generally isn't observable to the remover and that is difficult to remove. The digital content may include video content, image content, or any other content capable of being stored on a digital storage system. In some cases, a digital watermark may allow the content to be associated with the user. For instance, an individual watermark, such as a user identifier, may be applied to content transmitted to different users.

According to various embodiments, a watermark may be applied as a low frequency modification to a standalone image or a frame in a video content item. Many common encoding formats, such as JPEG, MJPEG, MPEG-2, MPEG-4 part 2, and MPEG-4 part 10 (H.264) achieve compression by breaking an image into blocks. The blocks are transformed into the frequency domain, and a low-pass filter is applied to discard high-frequency information. For the watermark modification to survive future compression, the watermark image may be low frequency in nature. According to various embodiments, a low frequency image may be an image that exhibits relatively gradual transitions and/or relatively constant color tone.

According to various embodiments, low amplitude, low frequency modifications may be difficult to notice by humans, for instance when the image has higher frequency information. However, the difference may be detected by a computer by comparing the watermarked image with the original image or with a differently watermarked image. Such a watermark may be difficult to detect and/or difficult to remove through transcoding.

According to various embodiments, a low frequency and/or low pixel value watermark image may be superimposed on a digital image. For instance, the watermark image pixel values may be mathematically added or subtracted to the digital image pixel values. The watermark image may contain a pattern that encodes data. For instance, the watermark image may contain sinusoidal or gradient-based wave patterns of various phases, patterns, or frequencies. The patterns may be placed at known locations in the images to encode data.

According to various embodiments, data may be encoded by varying the properties of the watermark image. For example, the phase and frequency of sinusoidal waves may be varied. As another example, gradient bars may be added or subtracted from a digital image. The amount of data that may be encoded may depend on the number of different patterns and positions that are available. For instance, if a single image can include watermark patterns at each of eight different positions and if four different patterns are available, then each image can encode sixteen bits of information. If 100 key frames in a video content item are each encoded in this way, then 1,600 bits may be encoded by watermarking the video content item. In some cases, some of the bits used in watermarking may be allocated for forward error correction to assist in recovery of the information if the content is distorted, lost, or damaged.

According to various embodiments, digital watermarking may be used for various purposes. For example, digital watermarking may be used to verify the source of the watermarked content by applying different watermarks to content transmitted from different sources. As another example, digital watermarking may be used to identify a content recipient. For instance, digital content such as streaming video transmitted from a server to a client machine may be watermarked with information that identifies the client machine or an account associated with the client machine. Then, if the digital content is recognized at another location, such as on a file sharing network, the digital content may be analyzed to retrieve the watermark. The watermark may then be used to identify the client machine or user account that originally received the watermarked content.

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, the content management service may receive content from various sources, such as content service providers. Then, the content management service may transcode the content for transmission to client machines. Content transcoding refers to any process for changing data encoded in one format to data encoded in a different format. In particular embodiments, transcoding may involve a lossy process that introduces generation loss into the resulting content encoding. Alternately, or additionally, transcoding may involve a lossless process such as lossless compression or decompression.

According to various embodiments, content sent from a service provider to client machines may be transcoded into various encoding formats for a variety of reasons. For instance, the content may be transcoded so that content may be transmitted to client devices that do not support the original format or that have a relatively limited storage capacity that can better handle a reduced file size. For instance, Cineon and DPX files have been widely used as a common format for digital cinema, but the data size of a two-hour movie is about 8 terabytes, which is much too large for streaming over currently available networks to modern content playback devices.

According to various embodiments, a content item such as a movie may be divided into different segments during the transcoding process. Each segment may include some number of video frames. By dividing the content item into segments, the segments can be transmitted individually to a client machine requesting the content. In this way, content can be streamed to the client machine in segments and can be presented at the client machine as soon as the next unplayed segment is received. Segments are also referred to herein as fragments.

According to various embodiments, some or all of the segments may have watermarks applied to them. A watermark may be applied to a segment by modifying one or more of the frames included in the segment. In particular embodiments, different encodings of a single segment may be created for transmission to client machines. Each of the different encodings may be the same or similar except for having a different watermark. Then, when the watermark is transmitted to a client machine, the media server transmitting the content may select from among the available encodings for a segment to create the video stream sent to the client machine. By appropriately selecting the encodings for potentially many such segments throughout a video stream, the media server may encode a specific data message in the video stream that may, for instance, be specific to the client machine or a user account associated with the client machine. At the same time, the video stream need not be separately encoded for the client machine, which may help all the video content to be distributed via a super-distribution framework.

In particular embodiments, techniques and mechanisms described herein may be used for HTTP streaming and/or FMP4 streaming technologies. However, the techniques and mechanisms are generally applicable to a wide range of video content technologies. For example, the techniques and mechanisms may be applied to images or videos encoding via JPEG, MPEG2, MPEG4 pt 2, or MPEG4 pt 10/H.264 technologies.

Although the content is often referred to herein as video content, the techniques and mechanisms described herein are generally applicable to a wide range of content and content distribution frameworks. For example, the content may be media content such as video, audio, or image content.

FIG. 1 shows a method 100 for the application of watermarks. According to various embodiments, the watermarks may be applied to digital images. In particular embodiments, the method 100 may be performed at a media system configured to provide media content management services to a plurality of client machines. Alternately, the method 100 may be performed at any other computing system.

According to various embodiments, the method 100 may be used to encode information in digital images that is difficult to detect and difficult to remove. In this way, the digital images may be marked with various types of information. The particular information included in the digital images be selected based on the particular use to which the watermarking is applied. For instance, the digital images may be watermarked with an identifier to facilitate the investigation of copyright infringement.

According to various embodiments, the method 100 may be performed as part of a transcoding or compression process for processing a digital image. For example, the image may be transcoded from one image format to another. As another example, the image may be compressed to reduce the storage space needed to store the image or to reduce the data size needed to transmit the image via a network.

At 102, a request to apply a watermark to a digital image is received. According to various embodiments, the watermark may be applied to any digital image. The digital image may be encoded via any of various formats, such as the JPEG format. In particular embodiments, the watermark may be applied to digital images that exhibit relatively high frequency of content. A high frequency image is one that includes relatively abrupt tonal transitions in a relatively small space. Examples of such images are the lettering on a license plate and an urban scene with bright colors and many edges. A low frequency image is one where the tone remains relatively constant throughout relatively small areas and the transitions are relatively gradual. Examples of such images include a blue sky and a facial portrait, the changes in tone in both images being subtle and smooth. When an image is of relatively high frequency, the addition of subtle changes via the application of a low frequency watermark may not be noticeable to the human eye. However, a low frequency watermark may be visible when applied to a low frequency image, perhaps appearing as subtle patterns on a field of relatively uniform color. In particular embodiments, as discussed herein, watermarks may be selectively applied to high frequency areas rather than low frequency areas to render the watermarks less likely to be visible.

In particular embodiments, the watermark may be applied to key frames within a segment of video content. A video content segment may include any number of video content frames. These video frames may be presented in quick succession to provide the illusion of motion. The video frames may include both key frames and intermediate frames. A key frame in animation and filmmaking is a frame that defines the starting and ending points of a smooth transition. An intermediate frame is a frame between key frames that help to create the illusion of motion. Depending on the video application, two key frames may be separated by zero, one, several, or many intermediate frames. In some cases, intermediate frames may be created automatically or dynamically based on the key frames. For instance, the intermediate frames may be modified if the video content transmitted to the client machine is subsequently transcoded or otherwise altered. Accordingly, the watermark may be applied to one or more of the key frames within the selected segment. In some cases, the same watermark may be applied to more than one key frame, which may improve robustness since if one key frame is lost or altered, the watermark may still be detectable in another key frame.

In particular embodiments, the watermark may be applied to video content frames distributed every few seconds throughout a video content item. By distributing the watermarked frames in this way, the watermarking may be made less apparent while the information contained in the watermark is distributed throughout the video content item.

At 104, a data message to include in the watermarked digital image is determined. According to various embodiments, various types of information may be included in the data message. For example, the data message may identify a content provider or other content source. As another example, the data message may identify the digital image recipient. For instance, the data message may include an account identifier associated with a content management account. Then, the digital image that includes the data message may be transmitted to a client machine associated with the content management account.

In particular embodiments, the data message may be divided among potentially many different digital images. For instance, each digital image may be a frame in a video content item. In some instances, a single instance of the data message may be distributed over the video content. Alternately, the data message may be repeated over the length of the video content. By repeating the data message, the message may be made robust against truncation of the video content. That is, if a portion of the video content is deleted, a complete copy of the data message may still be contained in the remaining portion of the video content. In particular embodiments, distribution and repetition of the message may be combined to make a longer data message more robust.

According to various embodiments, the data message may include forward error correction. Forward error correction, also referred to as channel coding, may facilitate the control of errors in data transmissions where data may be lost or distorted. Forward error correction may be accomplished by adding redundancy to the transmitted information. Forward error correction may be accomplished by any of various algorithms or encoding formats and typically involves a reduction in the amount of data that can be transmitted in a designated number of bits in exchange for added redundancy. In particular embodiments, ten bits of the data message may include eight bits of content and 2 bits of correction.

At 106, the image is segmented into pixel blocks, which may also be referred to as macroblocks (e.g., in the JPEG & MPEG standards). According to various embodiments, the image may be separated into pixel blocks for processing. For instance, during image compression, each pixel block may be analyzed to reduce or eliminate high frequency information. Each pixel block may be transformed into a frequency domain, which may allow the amount of high frequency information to be reduced.

According to various embodiments, a single watermark may be applied to the digital image as a whole. Alternately, watermarks may be applied separately to different pixel blocks. When watermarks are applied separately to different pixel blocks, the watermarks applied to different pixel blocks may be the same or may be different. By applying different watermarks to different pixel blocks, more information may be stored in a single watermarked image. By applying the same watermark to different pixel blocks, the information present in the image's watermark may be stored with additional redundancy. For example, if a portion of the image is cropped, the remainder of the image may still include complete pixel blocks that contain the watermark.

At 108, one or more pixel block is selected for applying a watermark. According to various embodiments, pixel blocks may be selected according to various criteria. In some cases, each pixel block in an image may be watermarked. Alternately, some pixel blocks may be selected for watermarking while other pixel blocks are not watermarked. In particular embodiments, the pixel blocks selected for watermarking may include those pixel blocks that contain high frequency information. As discussed herein, a low frequency watermark may be less visible when applied to a high frequency image than when applied to a low frequency image. For example, a subtle pattern of light and dark sinusoidal waves may be more visually apparent when superimposed on a picture of the night sky than when superimposed on a picture of a bright, urban landscape.

In particular embodiments, the identified one or more pixel blocks may include a set of adjacent pixel blocks. By grouping pixel blocks by adjacency, the likelihood of high-frequency transitions between the pixel blocks may be reduced. In some cases, high-frequency transitions between pixel blocks may cause block boundaries to become more visible to the human eye. Accordingly, selecting adjacent pixel blocks for applying a watermark image may reduce visual artifacts introduced via watermarking.

Figure 4:
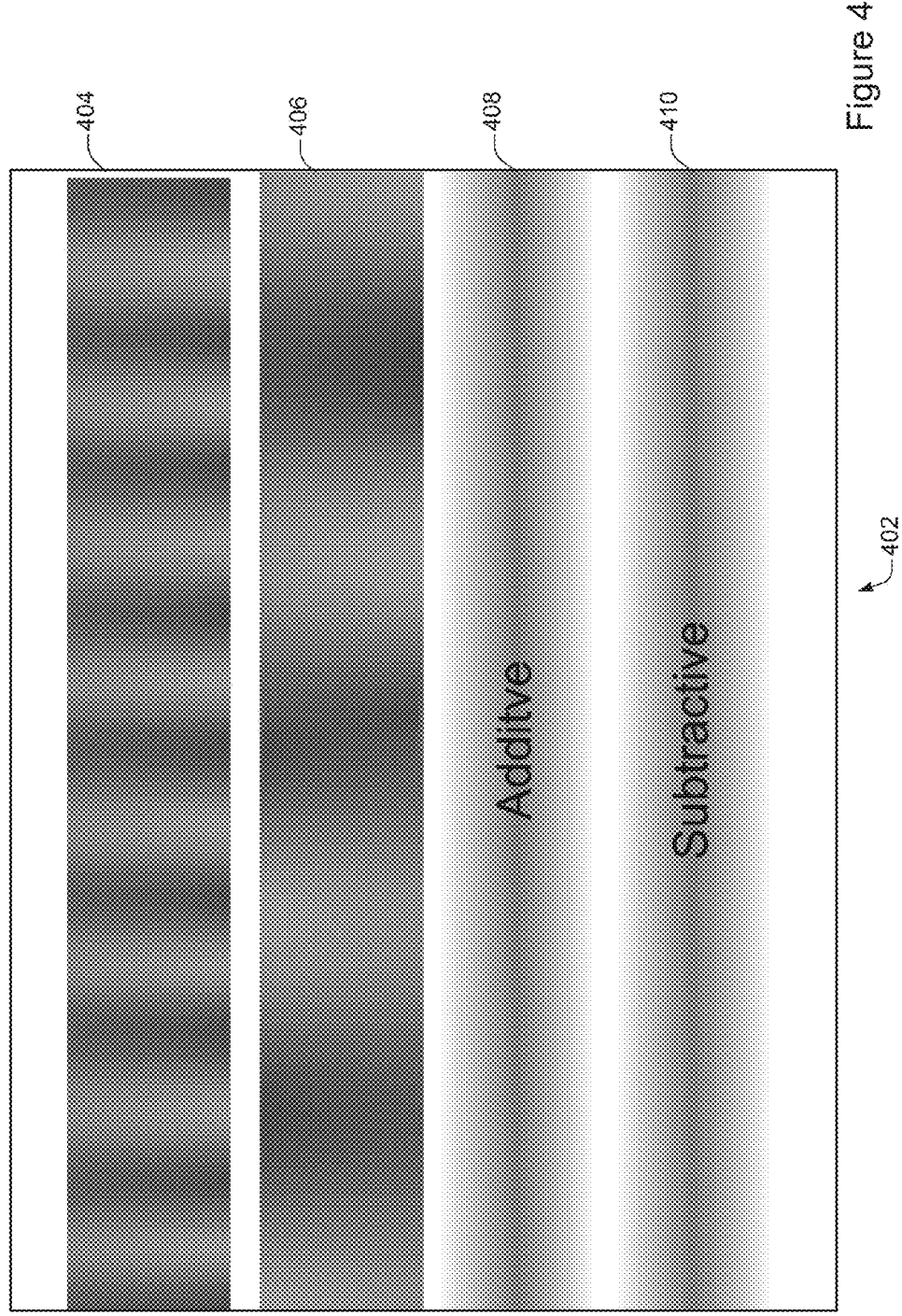
Figure 5:
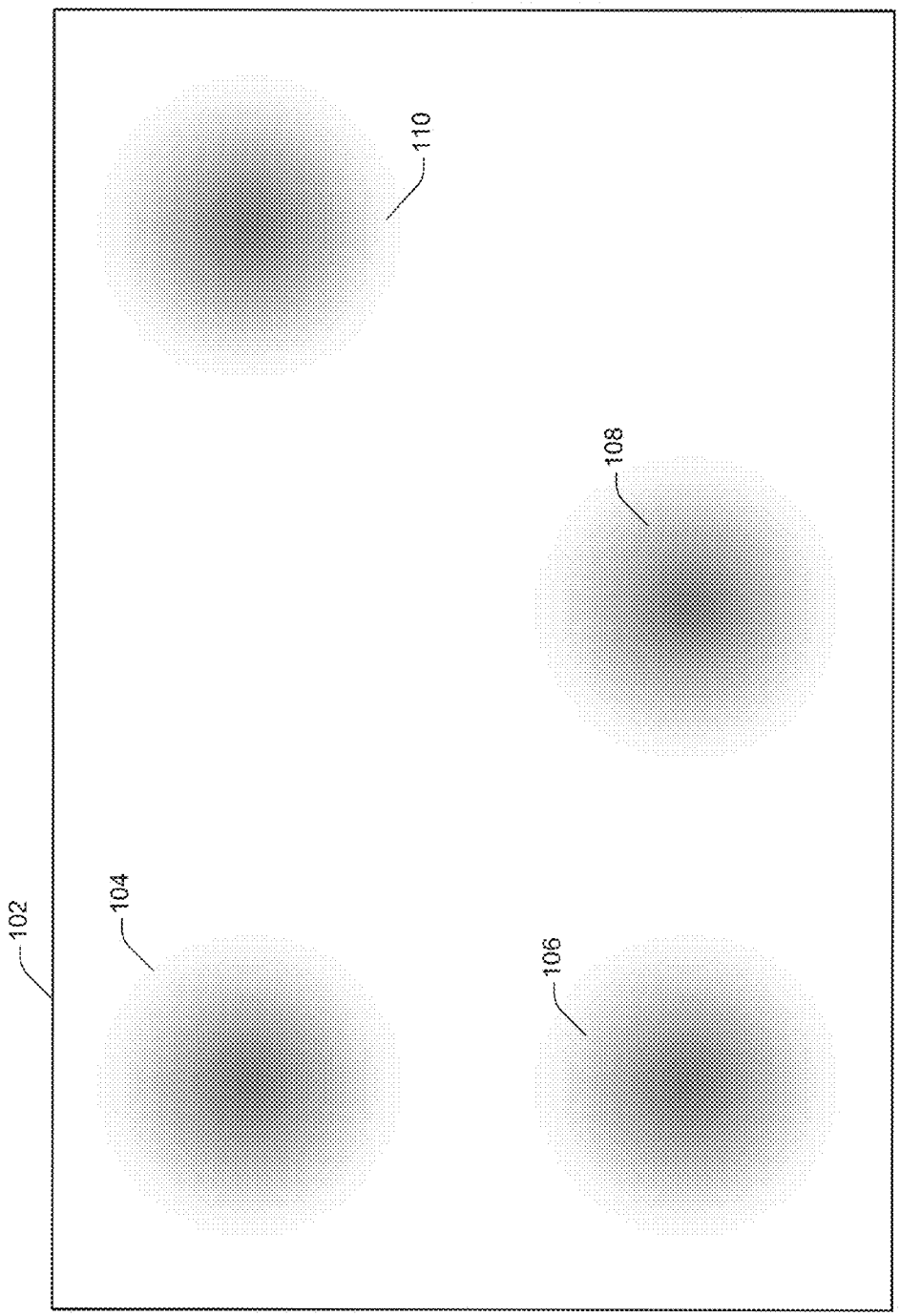

At 110, a low frequency watermark corresponding to the data message is identified. According to various embodiments, various types of low frequency watermarks may be used. For example, a low frequency watermark may be a spatial domain pattern of waves in which information is encoded in the wave frequency, the wave amplitude, the wave phase or position, the wave color (e.g., light or dark), the spacing between waves, and/or the size of the gradient surrounding the waves. As another example, a low frequency watermark may be a spatial domain pattern of dots at designated locations in an image or a pixel block in which information is encoded in the presence or absence of the dots, the color of the dots (e.g., light or dark), and/or the position of the dots, the size of the gradient surrounding the dots. As yet another example, a low frequency watermark may be a frequency domain pattern of bars or gradients in which information is encoded in the direction, presence, absence, location, or size of the gradient surrounding the bars or gradients. Examples of low frequency watermarks are shown in FIGS. 4-6.

In particular embodiments, a zero-frequency watermark alteration may be applied to a video content item. For instance, small alterations may be made to the hue, saturation, brightness, color value, luminance, and/or contrast of a watermarked image relative to a reference frame. Information may be encoded in slight changes in such values on a frame-by-frame basis. The watermark may be recovered by restoring a reference frame to the original huge, saturation, brightness, color value, luminance, and/or contrast, and then applying the adjustment to the rest of the video content item. Then, the watermark that is encoded as variances in these variables on a frame-by-frame basis could be detected.

According to various embodiments, the particular types of low frequency watermarks used may be strategically determined based on factors that may include, but are not limited to: the visibility of the watermark when applied to an image or pixel block, the difficult of detecting or removing the watermark via machine algorithms, the applicability of the watermark to different types of images or pixel blocks, and the amount of information that may be encoded in the watermark.

In particular embodiments, the type of watermark used may be determined based on the content of the image or pixel block to which the watermark is applied. For example, images or pixel blocks having relatively high frequency content may be watermarked with marks that contain relatively large amounts of information. As another example, images or pixel blocks having relatively low frequency content may not be watermarked at all or may be watermarked with more subtle watermarks that contain relatively less information.

At 112, the watermark is superimposed on the digital pixel block. According to various embodiments, superimposing the watermark on the digital pixel block may involve adding or subtracting the watermark pixel values to or from the digital pixel block values. For instance, a digital pixel in the digital pixel block may have a data value of "243", while the corresponding watermark pixel value superimposed on the digital pixel may have a value of "+3". In this case, the values may be added together to achieve a value of "246" for the watermarked digital image pixel.

According to various embodiments, the watermark may be superimposed on the digital pixel block in the spatial domain. The spatial domain is a representation of the pixel block that is similar to how the pixel block will actually be presented on a display screen. In the spatial domain, a pixel in the pixel block may correspond to a pixel on the display screen, and the data value of the pixel may correspond to a color displayed in the corresponding pixel on the display screen. Of course, pixels in the pixel block may not always have a one-to-one correspondence with pixels on the display screen since images can be displayed at different sizes. In particular embodiments, a pixel may be associated with coefficients for different base colors (e.g., red, blue, and green color components). To maintain color neutrality, the addition or subtraction of the watermark may be performed for each of the color coefficients.

According to various embodiments, the watermark may be superimposed on the digital pixel block in the frequency domain. The frequency domain is a representation of the pixel block based on the frequency of information in the image block. An image or pixel block may be transformed into the frequency domain by the application of a transform, such as the discrete cosine transform. The frequency domain may allow very detailed (i.e. high-frequency) information in the pixel block to be separated from very gradual or undetailed (i.e. low-frequency) information. When in the frequency domain, the watermark may be applied as adjustments to the low frequency areas, which may be less likely to be altered by subsequent alteration or encoding of the pixel block.

In particular embodiments, color neutrality may be maintained during watermarking applied during the frequency domain by adding or subtracting watermarking values to a luminance or brightness component of a pixel. In some cases, watermark alterations in the frequency domain may be applied entirely or primarily to the low-frequency portion of the pixel block since low frequency coefficients are less likely to be truncated during the quantization process. Accordingly, low-frequency coefficients may be more likely to be preserved.

At 114, a determination is made as to whether to select an additional pixel block for applying a watermark. As discussed with respect to operation 108, various criteria may be used to select pixel blocks for applying watermarks. For instance, in some cases all pixel blocks in an image may be watermarked. In other cases, only designated pixel blocks may be watermarked, such as pixel blocks that include relatively high frequency information.

At 116, the pixel blocks to create a watermarked digital image are combined to create a watermarked digital image. In particular embodiments, the combination and processing of the pixel blocks may involve one or more operations related to encoding or compressing the image. For example, the image or pixel blocks may be transformed into a frequency domain. While in the frequency domain, designated high frequency information may be dropped or softened. As another example, the image may be compressed according to a compression framework such as that used in the JPEG encoding format.

At 118, the watermarked digital image and the digital image watermark are stored. According to various embodiments, the digital image and the watermark may be stored on a storage medium. In particular embodiments, different image frames to which watermarks have been applied may be combined, often with unwatermarked image frames, to create a video content item. The video content item may be stored on a media server for transmission to client machines. In particular embodiments, information such as the locations and types of watermarks applied may be stored. Storing such information may assist in identifying watermarked images and image watermarks. The identification of watermarked images and image watermarks is discussed in further detail with respect to FIG. 7.

According to various embodiments, the watermarked digital image and/or the digital image watermark may be stored in the spatial domain (e.g. GIF, PNG). Alternately, or additionally, the watermarked digital image and/or the digital image watermark may be stored in the frequency domain (e.g. JPEG, MPEG).

According to various embodiments, the digital image watermark may be stored at a central server. The digital image watermark may be stored for later comparison with watermarks identified in subsequently analyzed images, for instance images analyzed to investigate copyright infringement. For example, image frames of a video content item distributed on the Internet may be analyzed to identify a watermark. Then, the watermark may be compared to watermarks stored on the server to identify a user account associated with the original recipient of the video content item. Techniques for retrieving a watermark from a digital image are discussed in additional detail with respect to FIG. 7.

Figure 2:
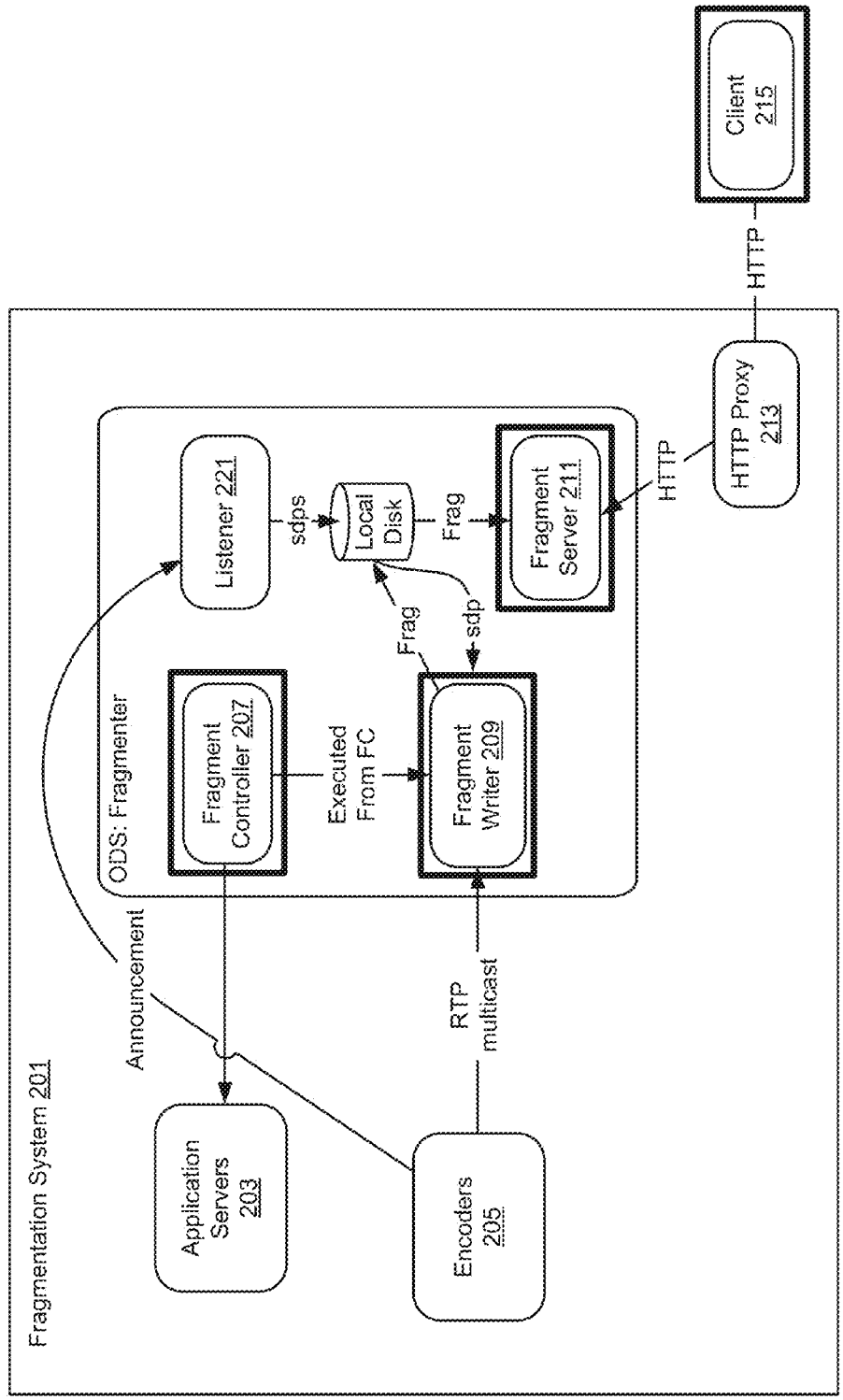
FIGS. 2 and 3 illustrate examples system that can be used with various techniques and mechanisms of the present invention.

FIG. 2 is a diagrammatic representation illustrating one example of a fragment or segment system 201 associated with a content server that may be used in a broadcast and unicast distribution network. Encoders 205 receive media data from satellite, content libraries, and other content sources and sends RTP multicast data to fragment writer 209. The encoders 205 also send session announcement protocol (SAP) announcements to SAP listener 221. According to various embodiments, the fragment writer 209 creates fragments for live streaming, and writes files to disk for recording. The fragment writer 209 receives RTP multicast streams from the encoders 205 and parses the streams to repackage the audio/video data as part of fragmented MPEG-4 files. When a new program starts, the fragment writer 209 creates a new MPEG-4 file on fragment storage and appends fragments. In particular embodiments, the fragment writer 209 supports live and/or DVR configurations.

The fragment server 211 provides the caching layer with fragments for clients. The design philosophy behind the client/server application programming interface (API) minimizes round trips and reduces complexity as much as possible when it comes to delivery of the media data to the client 215. The fragment server 211 provides live streams and/or DVR configurations.

The fragment controller 207 is connected to application servers 203 and controls the fragmentation of live channel streams. The fragmentation controller 207 optionally integrates guide data to drive the recordings for a global/network DVR. In particular embodiments, the fragment controller 207 embeds logic around the recording to simplify the fragment writer 209 component. According to various embodiments, the fragment controller 207 will run on the same host as the fragment writer 209. In particular embodiments, the fragment controller 207 instantiates instances of the fragment writer 209 and manages high availability.

According to various embodiments, the client 215 uses a media component that requests fragmented MPEG-4 files, allows trick-play, and manages bandwidth adaptation. The client communicates with the application services associated with HTTP proxy 213 to get guides and present the user with the recorded content available.

Figure 3:
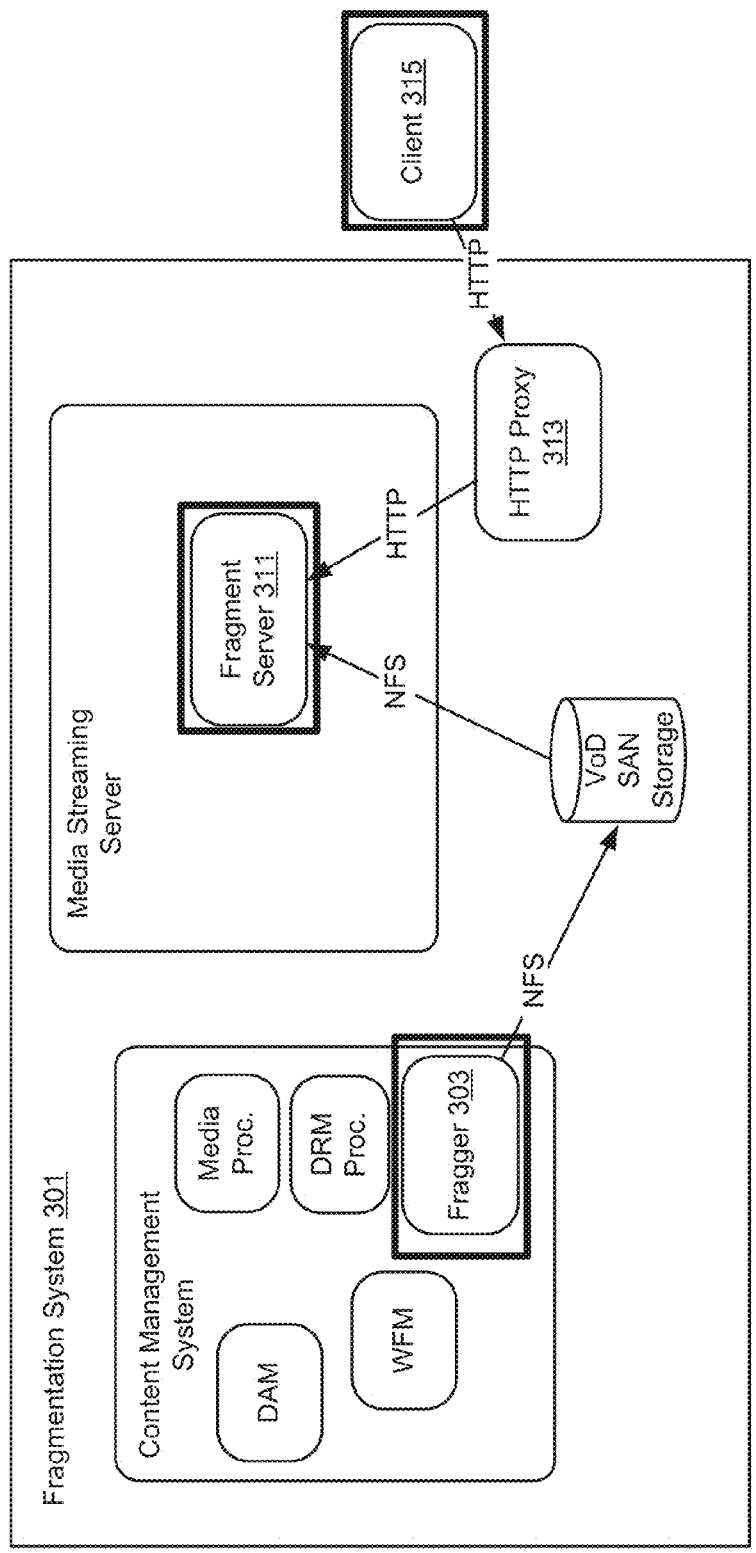

FIG. 3 illustrates one example of a fragmentation system 301 that can be used for video-on-demand (VoD) content. Fragger 303 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 311 provides the caching layer with fragments for clients. The design philosophy behind the client/server API minimizes round trips and reduces complexity as much as possible when it comes to delivery of the media data to the client 315. The fragment server 311 provides VoD content.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

FIG. 4 illustrates an example of a low frequency watermark image 402. According to various embodiments, the watermark image 402 may be superimposed on a digital image encoded in the spatial domain to embed hidden information in the digital image. The watermark image 402 includes the bar patterns 404-410. The bar patterns 404 and 406 are sinusoidal gradient waves. The bar patterns 408 and 410 are gradient bars that may be respectively added to and subtracted from a digital image to which the watermark is applied.

It should be noted that the watermark images shown herein are exaggerated for the purposes of illustration. White watermark pixel values indicate no alteration to the underlying image while black watermark pixel values indicate the maximum alteration to the underlying image when applying the watermark. Shades of gray represent alterations between zero and the maximum. However, even the maximum alteration to the underlying image when applying a watermark is relatively small, since a more significant alteration to the pixel values in the underlying image a likely to be visible to the human eye. That is, the illustration uses higher pixel values to make the watermark easy to see for the purpose of illustration. According to various embodiments, each alteration may be either an addition or a subtraction to the pixel values on which the watermark is superimposed.

According to various embodiments, different watermark patterns may be used to encode different information. For example, FIG. 4 includes the sinusoidal gradient waves 404 and 406. These gradient waves differ in the frequency of the wave pattern. As another example, FIG. 4 includes the gradient bars 408 and 410. These gradient bars differ in that the first is added to the pixel values underlying digital image, while the second is subtracted from the corresponding pixel values of the underlying digital image. The terms "Additive" and "Subtractive" in the image are for labeling purposes only and are not intended to be part of the watermark patterns.

According to various embodiments, watermark images may encode various amounts of information. In the example shown in FIG. 4, the watermark image 402 includes four different types of watermark bar patterns. Since any bar position can be one of four patterns, a total of two bits of information can be encoded in each bar position. In the example shown in FIG. 4, the watermark image 402 includes bars in four bar positions. Since each bar can encode two bits of information and since the watermark image 402 can include a total of four bars, the watermark image can encode a total of eight bits of information. For example, the bar shapes 402-404 may correspond to the bit strings "10", "11", "00", and "01" respectively. By placing these patterns in order, the complete message included in the watermark 402 may be read as "10110001".

According to various embodiments, a watermark image may introduce various types of variation to encode information. For instance, a watermark image may introduce sinusoidal variance in image properties that may include, but are not limited to: hue, saturation, brightness, color value, luminance, or contrast. The sinusoidal variance may be applied via a gradient that changes intensity with the wave pattern, as shown in the waves 404 and 406. A gradient provides a lower-frequency image than a sharp line. As discussed herein, a lower-frequency watermark image which may allow the watermark to be less visible and more difficult to remove than a higher frequency image.

According to various embodiments, a watermark image may include any of various types of shapes or images. For example, the watermark image shown in Figure includes four types of patterns that may be placed in any of four locations. However, other watermarks may include any number of different objects arranged at any number of different locations. As another example, information may be encoded in various image properties. For instance, waves having different amplitudes and/or frequencies may represent different bit values. As another example, information may be encoded in patterns other than those shown in FIG. 4. In particular embodiments, the shapes or patterns used to encode information in a watermark may be strategically determined based on factors that may include, but are not limited to: the visibility of different patterns to the human eye, the detectability and/or removability of different patterns by computer algorithms, and the type of image (e.g., the frequency) that the watermark is being applied to.

FIG. 5 illustrates an example of a low frequency watermark image 502. According to various embodiments, the watermark image 502 may be superimposed on a digital image encoded in the spatial domain to embed hidden information in the digital image. The watermark image 502 includes the gradient dots 504-510.

According to various embodiments, the watermark images 402 and 502 may be superimposed on an entire image or on a portion on the image, such as a pixel block. When the watermark image is superimposed on a pixel block, each pixel block can include the same watermark image or a different watermark image. Superimposing a different watermark image on each pixel block allows for storing more information, while superimposing the same watermark image on each pixel block allows for greater redundancy.

According to various embodiments, each of the gradient dots 504-510 includes a dot surrounded by a gradient. By including a gradient in the watermark image, the watermark image becomes a lower-frequency image than would be the case in the absence of a gradient. A lower-frequency image may be less visible and more difficult to remove than a higher frequency image.

According to various embodiments, information may be encoded in the presence or absence of dots. For instance, the watermark image 502 includes six positions, two rows of three, at which dots may or may not be present. In this example, a "1" may be encoded with the presence of a dot, while a "0" may be encoded with the absence of a dot. Since six positions may each be encoded with one bit, a total of six bits of information may be encoded. In the example shown in FIG. 5, the first row of the watermark image encodes a bit string of "101", while the second row of the watermark image encodes a bit string of "110". Accordingly, the watermark image 502 encodes the bit string of "101110".

In particular embodiments, each dot location may be used to store an additional value. For example, each dot may be either present or absent, and each present dot may be either added or subtracted from the digital image. In this example, each dot location may be used to store one of three values (i.e. a trinary bit). For instance, the dot values may be mapped as 0 for an absent dot, 1 for a present and added dot, and 2 for a present and subtracted dot, or any other mapping of trinary digits to absent, added, and subtracted dots. The data encoded in the dot locations in a digital watermark may then be combined to store a trinary number such as "102210".

According to various embodiments, a watermark image may include any of various types of shapes or images. For example, the watermark image shown in FIG. 4 includes six positions that each may or may not include a gradient dot. However, other watermarks may include any number of positions for gradient dots. As another example, the shapes used in FIG. 4 are dots surrounded by gradients. However, other watermarks may include various types of shapes to encode information. For example, a reverse gradient dot that lightens rather than darkens a digital image on which it is superimposed may be used to encode information.

Figures 6A, 6B:
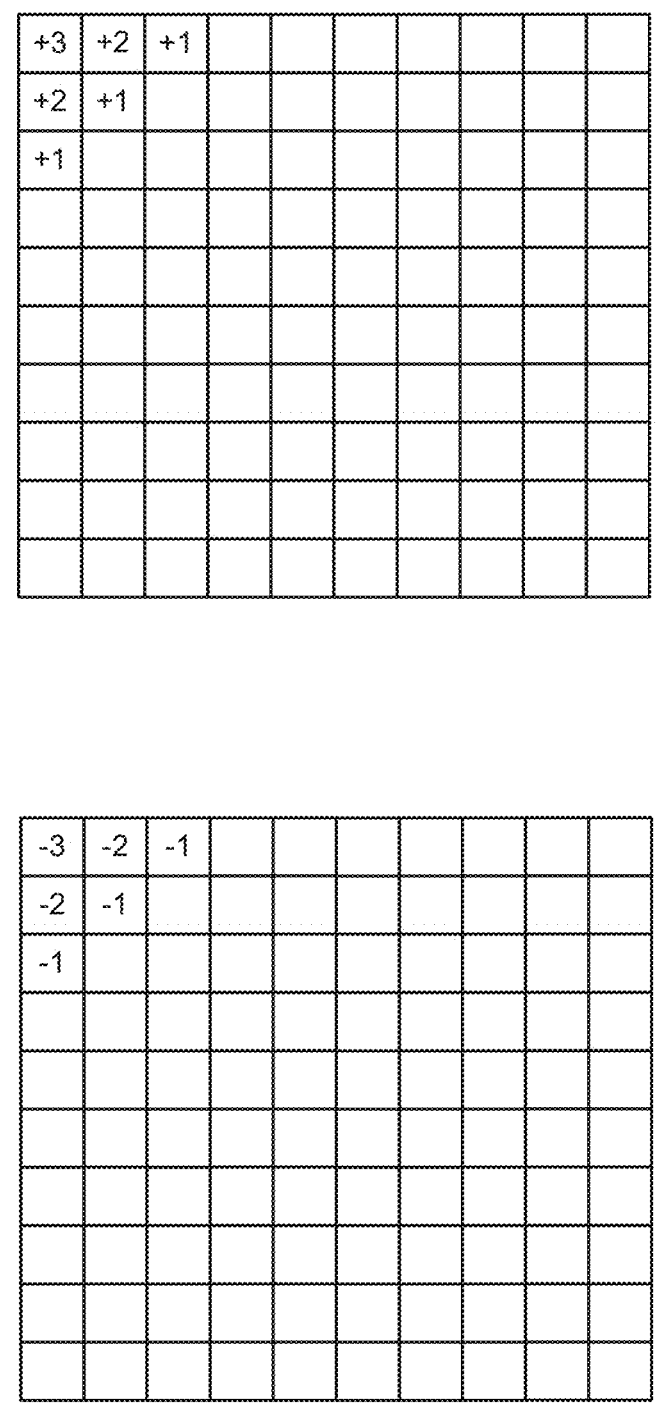

FIGS. 6A and 6B illustrate examples of low frequency watermark images. According to various embodiments, either of the low frequency watermark images shown in FIGS. 6A and 6B may be superimposed on a digital image in the frequency domain to embed hidden information in the digital image.

According to various embodiments, the changes included in the watermarks 6A and 6B may be focused in the upper left of the watermark. When an image is encoded in the frequency domain, the upper left of the frequency domain image typically corresponds to lower-frequency spatial image characteristics, while the lower right of the frequency domain image typically corresponds to higher-frequency spatial image characteristics. An image may be transformed to the frequency domain for encoding, compression, transmission, or other operations. Then, the image may be transformed back to the spatial domain for presentation on a device such as a display screen.

According to various embodiments, the changes may be applied to the upper left, lower-frequency area of the image for various reasons. For example, more subtle changes that affect a larger portion of an image may be less likely to be visible than sharper changes to a smaller portion of an image. As another example, these more subtle changes may be less likely to be detected by computer algorithms. As yet another example, these more subtle changes may be less likely to be removed or altered by subsequent encoding or digital processing. For instance, many image compression schemes first transform an image into the frequency domain and then discard some or all of the higher-frequency information stored in the lower right of the frequency domain image. This process, often referred to as quantization, results in an image whose essential features remain unchanged but that has a reduced level of detail. By focusing the watermark on the lower-frequency portion of the frequency domain image, the watermark is made more likely to survive such an alteration.

According to various embodiments, the numbers shown in the watermark images in FIGS. 6A and 6B may correspond to changes to the coefficient values of a frequency domain image on which the watermark is superimposed. For instance, an underlying coefficient value in the frequency domain may have a value of "47". Here, a "+3" would increase the coefficient value to "50", while a "−3" would decrease the coefficient value to "44".

According to various embodiments, the watermarks shown in FIGS. 6A and 6B may encode information in various ways. For instance, the watermark image shown in FIG. 6A may correspond to a "1" when superimposed on an image in the frequency domain, while the watermark image shown in FIG. 6B may correspond to a "0". Although only two patterns are shown in FIGS. 6A and 6B, various types of frequency-domain patterns may be used to encode watermark images. In particular embodiments, the shapes or patterns used to encode information in a watermark may be strategically determined based on factors that may include, but are not limited to: the visibility of different patterns to the human eye, the detectability and/or removability of different patterns by computer algorithms, and the type of image (e.g., the frequency) that the watermark is being applied to.

According to various embodiments, the watermark images shown in 6A and 6B may be superimposed on an entire image or on a portion on the image, such as a pixel block. When the watermark image is superimposed on a pixel block, each pixel block can include the same watermark image or a different watermark image. Superimposing a different watermark image on each pixel block allows for storing more information, while superimposing the same watermark image on each pixel block allows for greater redundancy.

Figure 7:
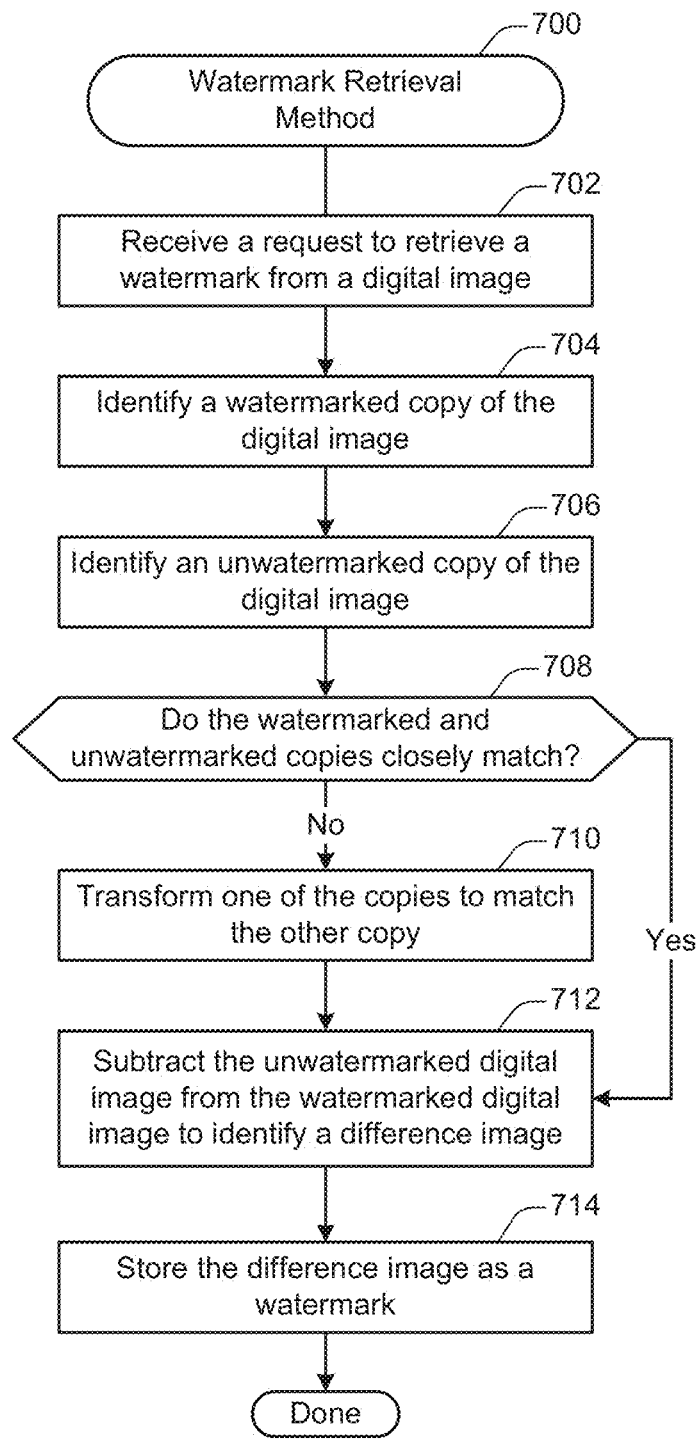
FIG. 7 illustrates one example of a watermark retrieval method.

FIG. 7 illustrates one example of a watermark retrieval method 700. According to various embodiments, the method 700 may be used to retrieve a watermark that has been applied to a digital image. The watermarked digital image may be analyzed for various purposes. For example, the watermarked digital image may be analyzed to determine who created the digital image or who received the digital image. As another example, the watermarked digital image may be analyzed to identify an owner of the image or as part of a copy protection scheme.

According to various embodiments, the method 700 may be applied to any number of watermarked digital images. For instance, the method 700 may be applied to a series of watermarked digital video frames included in a watermarked digital content item. Then, the watermarks retrieved via the method 700 may be combined to determine a data message encoded in the watermarks. The particular use of the watermark retrieval method 700 may depend at least in part upon the type of information encoded via watermarking and the images in which the information was encoded.

At 702, a request to retrieve a watermark from a digital image is received. According to various embodiments, the request may be received at a server operable to provide media analysis services. The server may be the same system used to perform the watermarking application discussed with respect to FIG. 1 or it may be a different server. For example, the request may be received at one of the systems discussed with respect to FIG. 2 or 3 or may be received at any computer system that has access to an unwatermarked copy of the digital image.

At 704, a watermarked copy of the digital image is identified. According to various embodiments, the watermarked copy of the digital image may be the image under analysis. For example, the watermarked copy of the digital image may be a copy of a copyrighted image being distributed on a network such as the Internet. As another example, the watermarked copy of the digital image may be a video frame of a watermarked video being distributed over a peer-to-peer network.

At 706, an unwatermarked copy of the digital image is identified. According to various embodiments, the unwatermarked copy of the digital image may be stored on the server for analysis. For instance, the unwatermarked copy of the digital image may be retrieved from an image source. If, for example, the digital image is a video frame of a video content item, then the unwatermarked copy of the digital image may be retrieved by analyzing the video content source item used to generate the watermarked video frame.

In particular embodiments, the location of watermarks that were applied to the digital image may have previously stored and may be used to aid in the comparison. For instance, the watermarks applied to the digital image may be stored as discussed in reference to operation 118 shown in FIG. 1.

The location of watermarks that were applied may have been previously stored which could assist in the recovery. (step 118)

According to various embodiments, the images may be identified in a raw pixel format. In a raw pixel format, the image is stripped of any encoding that may be used to store or format the image. The image is then stored in a manner where each pixel in the image has a corresponding pixel data value that designates the color for displaying the pixel on a display screen.

At 708, a determination is made as to whether the watermarked and unwatermarked copies closely match. According to various embodiments, the determination may depend on a number of different factors that may be used to characterize the images. For example, one image may be scaled to a larger or smaller size than the other. As another example, the watermarked image may be cropped or distorted. As yet another example, the watermarked image may have a higher or lower contrast ratio or brightness than the unwatermarked image.

According to various embodiments, the determination may be made at least in part by comparing the pixel values of the two copies. Alternately, or additionally, the determination may involve comparing other properties of the two images, such as the number of pixels in each dimension.

At 710, one or both of the copies is transformed to match the other copy. According to various embodiments, the particular transformation performed may be selected based on the type of difference between the two copies. For instance, if the two copies are of different sizes, then one of the copies may be resized to match the other. As another example, if one of the two copies is systematically darker or lighter than the other, then a brightness level of one or both of the copies may be adjusted. In particular embodiments, a number of transformations may be manually or automatically selected to identify the best match between the two copies. For instance, a user attempting to remove a watermark may perform some combination of resizing, cropping, brightening, or otherwise altering the image. To account for this, a number of transformations may be run to attempt to reconcile the differences between the two images.

At 712, the unwatermarked digital is subtracted from the watermarked digital image to identify a different image. According to various embodiments, the subtraction may be performed by comparing one or more data pixel values associated with pixels in the watermarked digital image with one or more data pixel values associated with pixels in the unwatermarked digital image. For instance, a watermarked digital image may have a data value of "246" for a given pixel, while the corresponding unwatermarked digital image may have a data value of "243" for a given pixel. Performing the subtraction yields a data value of "3" for the corresponding pixel value in the difference image.

At 714, the difference image is stored as a watermark. According to various embodiments, subsequent analysis may be used to process the information encoded in the watermark. For instance, as discussed with respect to FIG. 1, watermarks may be stored on a server for comparison. The watermark stored at operation 714 may be compared with watermarks previously stored on the server to identify various types of information. For example, the watermark may include a content management account identifier that identifies a content management account associated with a client machine that received the digital image that was watermarked. If the image was recovered as part of an analysis of a potential copyright violation, then the account management identifier may be used to identify a user or a content management account that was associated with the distribution of the watermarked content.

Figure 8:
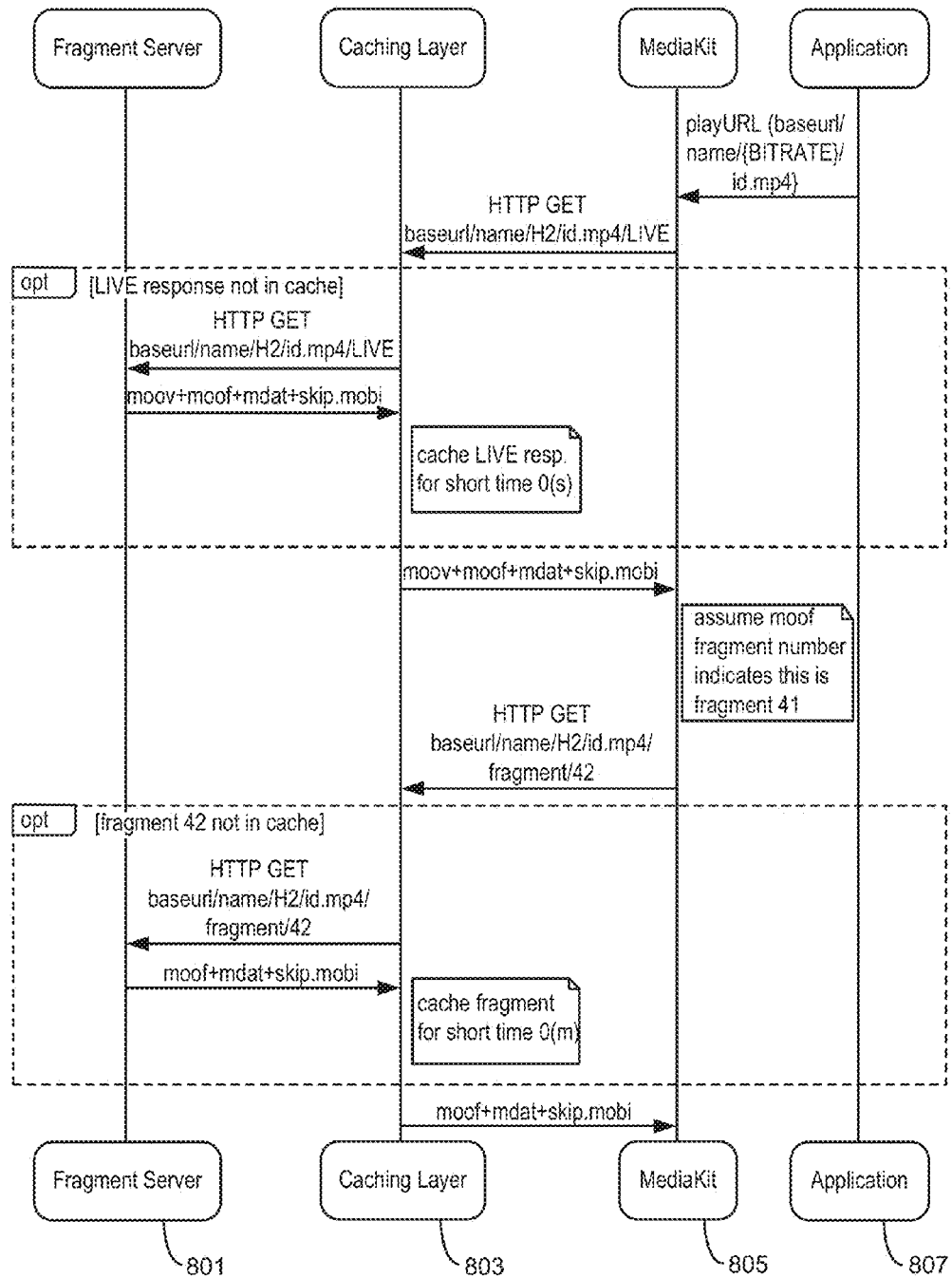
FIG. 8 illustrates one example of an exchange used with a media delivery system.

FIG. 8 illustrates an interaction for a client receiving a media stream such as a live stream. The client starts playback when fragment 81 plays out from the server. The client uses the fragment number so that it can request the appropriate subsequent file fragment. An application such as a player application 807 sends a request to mediakit 805. The request may include a base address and bit rate. The mediakit 805 sends an HTTP get request to caching layer 803. According to various embodiments, the live response is not in cache, and the caching layer 803 forwards the HTTP get request to a fragment server 801. The fragment server 801 performs processing and sends the appropriate fragment to the caching layer 803 which forwards to the data to mediakit 805.

The fragment may be cached for a short period of time at caching layer 803. The mediakit 805 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 805 may request a next fragment having a different data rate. In some instances, the mediakit 805 may request a next fragment having a higher data rate. According to various embodiments, the fragment server 801 maintains fragments for different quality of service streams with timing synchronization information to allow for timing accurate playback.

The mediakit 805 requests a next fragment using information from the received fragment. According to various embodiments, the next fragment for the media stream may be maintained on a different server, may have a different bit rate, or may require different authorization. Caching layer 803 determines that the next fragment is not in cache and forwards the request to fragment server 801. The fragment server 801 sends the fragment to caching layer 803 and the fragment is cached for a short period of time. The fragment is then sent to mediakit 805.

Figure 9:
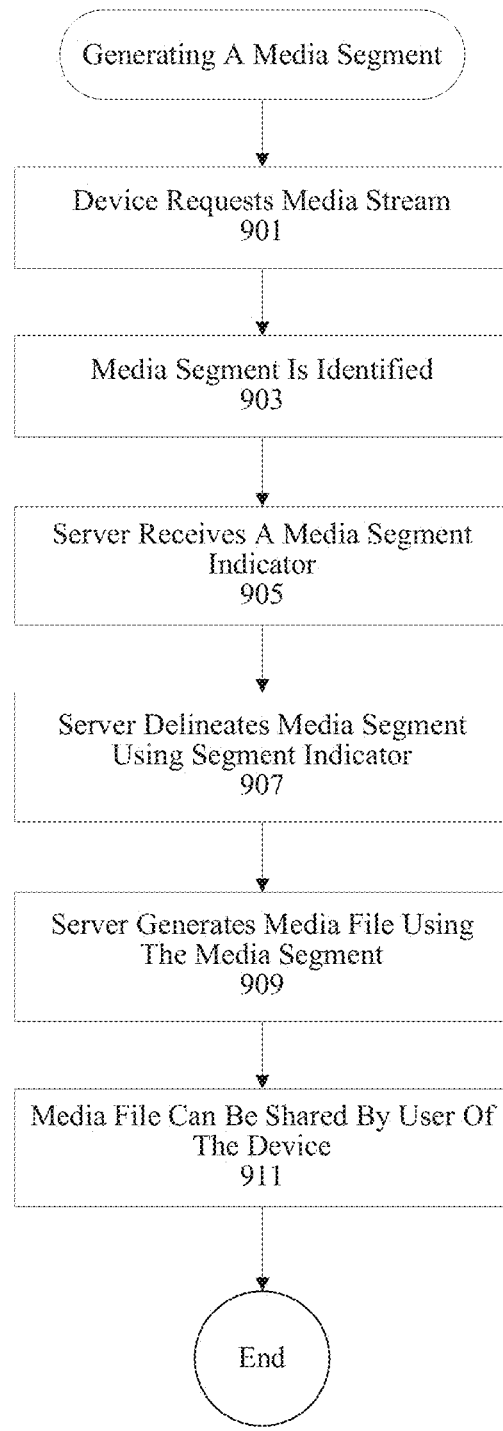
FIG. 9 illustrates one technique for generating a media segment.

FIG. 9 illustrates a particular example of a technique for generating a media segment. According to various embodiments, a media stream is requested by a device at 901. The media stream may be a live stream, media clip, media file, etc. The request for the media stream may be an HTTP GET request with a baseurl, bit rate, and file name. At 903, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 905, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 907. The media stream may only be available in a channel buffer. At 909, the server generates a media file using the media segment maintained in cache. The media file can then be shared by a user of the device at 911. In some examples, the media file itself is shared while in other examples, a link to the media file is shared.

Figure 10:
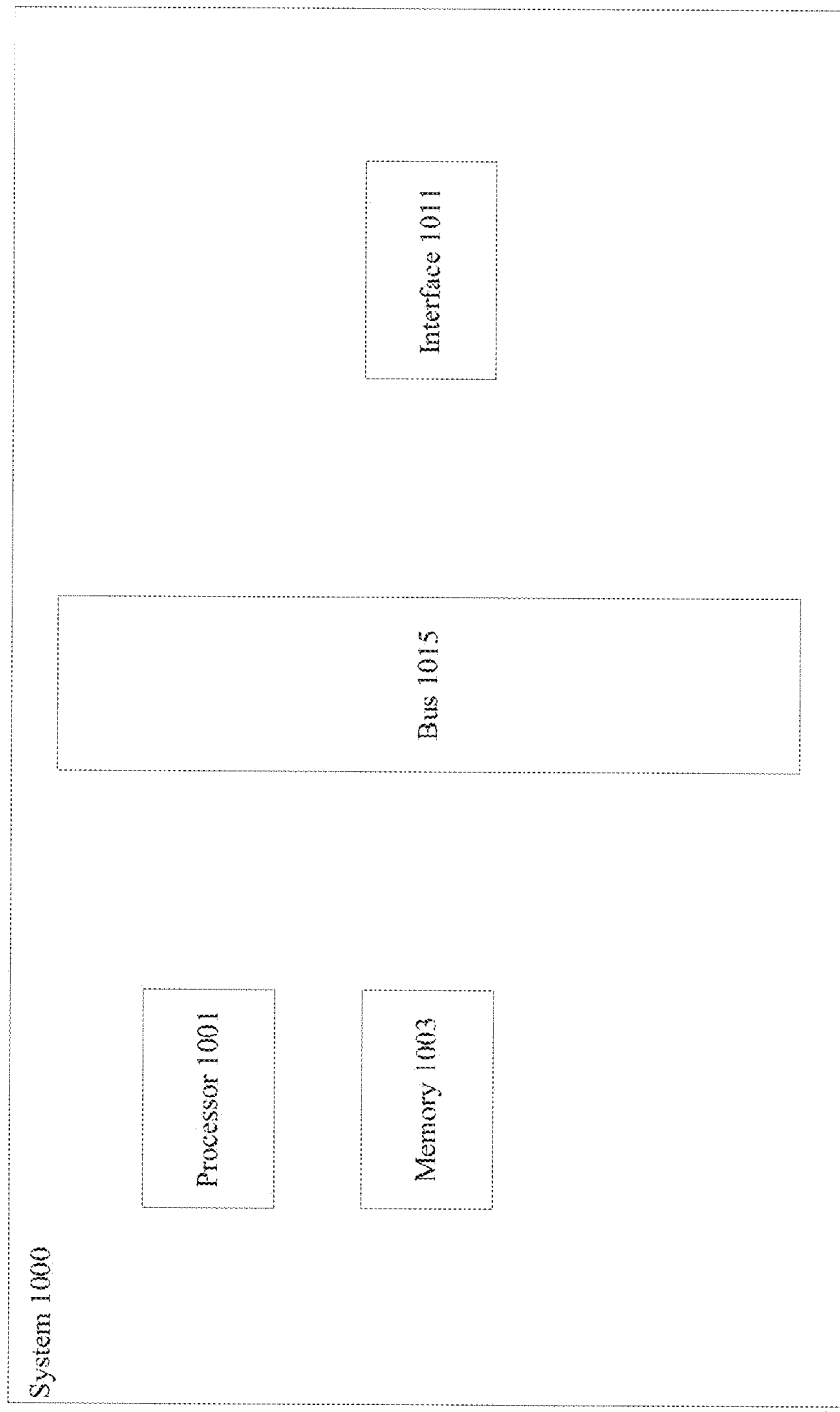
FIG. 10 illustrates one example of a system that can be used with various techniques and mechanisms of the present invention.

FIG. 10 illustrates one example of a server. According to particular embodiments, a system 1000 suitable for implementing particular embodiments of the present invention includes a processor 1001, a memory 1003, an interface 1011, and a bus 1015 (e.g., a PCI bus or other interconnection fabric) and operates as a streaming server. When acting under the control of appropriate software or firmware, the processor 1001 is responsible for modifying and transmitting live media data to a client. Various specially configured devices can also be used in place of a processor 1001 or in addition to processor 1001. The interface 1011 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1000 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   identifying a watermark image to apply to a video frame, the video frame including a plurality of image pixel data values, each of the image pixel data values designating a color of a corresponding pixel in the video frame, the watermark image including a plurality of watermark pixel data values, each of the watermark pixel data values designating a color change to a corresponding pixel, the watermark image identifying a recipient of the video frame;
   transforming the video frame from the spatial domain into the frequency domain;
   superimposing the watermark image on at least a portion of the video frame in the frequency domain to create a watermarked video frame, the watermarked video frame including a plurality of watermarked image pixel data values corresponding to the image pixel data values altered by the color change designated in the corresponding watermark pixel data values; and
   transmitting the watermarked image to a plurality of video frame recipients, wherein watermarked images transmitted to different recipients include different watermarks;
   wherein the watermark image comprises an image gradient that represents a gradual, directional change in the color or intensity of the watermark.

2. The method recited in claim 1, the method further comprising:
   dividing the image pixel data values into a plurality of image pixel blocks, wherein the watermark image is superimposed on selected ones of the image pixel blocks.

3. The method recited in claim 1, wherein the watermark image encodes a data message.

4. The method recited in claim 1, wherein the data message is encoded in a frequency or amplitude of waves represented in the watermark image.

5. A system comprising:
   a memory module operable to store a watermark image for applying to a video frame, the video frame including a plurality of image pixel data values, each of the image pixel data values designating a color of a corresponding pixel in the video frame, the watermark image including a plurality of watermark pixel data values, each of the watermark pixel data values designating a color change to a corresponding pixel, the watermark image identifying a recipient of the video frame;
   a processor operable to transform the video frame from the spatial domain into the frequency domain and to superimpose the watermark image on at least a portion of the video frame in the frequency domain to create a watermarked video frame, the watermarked video frame including a plurality of watermarked image pixel data values corresponding to the image pixel data values altered by the color change designated in the corresponding watermark pixel data values; and
   a communications interface operable to transmit the watermarked image video frame to a plurality of video frame recipients, wherein watermarked images transmitted to different recipients include different watermarks;
   wherein the watermark image comprises an image gradient that represents a gradual, directional change in the color or intensity of the watermark.

6. The system recited in claim 5, wherein the processor is further operable to:
   divide the image pixel data values into a plurality of image pixel blocks, wherein the watermark image is superimposed on selected ones of the image pixel blocks.

7. The system recited in claim 5, wherein the watermark image encodes a data message.

8. The system recited in claim 5, wherein the data message is encoded in a frequency or amplitude of waves represented in the watermark image.

9. One or more non-transitory computer readable media having instructions stored thereon for performing a method, the method comprising:
   identifying a watermark image to apply to a video frame, the video frame including a plurality of image pixel data values, each of the image pixel data values designating a color of a corresponding pixel in the video frame, the watermark image including a plurality of watermark pixel data values, each of the watermark pixel data values designating a color change to a corresponding pixel, the watermark image identifying a recipient of the video frame;
   transforming the video frame from the spatial domain into the frequency domain;
   superimposing the watermark image on at least a portion of the video frame in the frequency domain to create a watermarked video frame, the watermarked video frame including a plurality of watermarked image pixel data values corresponding to the image pixel data values altered by the color change designated in the corresponding watermark pixel data values; and
   transmitting the watermarked video frame to a plurality of video frame recipients, wherein watermarked images transmitted to different recipients include different watermarks;
   wherein the watermark image comprises an image gradient that represents a gradual, directional change in the color or intensity of the watermark.

* * * * *

UNITED STATES PATENT AND TRADEMARK OFFICE
CERTIFICATE OF CORRECTION

PATENT NO. : 9,292,897 B2
APPLICATION NO. : 13/646520
DATED : March 22, 2016
INVENTOR(S) : Brubeck Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this
Twenty-sixth Day of July, 2016

Michelle K. Lee
*Director of the United States Patent and Trademark Office*